United States Patent
Sian et al.

(10) Patent No.: US 6,449,072 B1
(45) Date of Patent: Sep. 10, 2002

(54) ADD/DROP MULTIPLEXER

(75) Inventors: Surinder Sian, Kent; Steve Penticost, Hertfordshire; Christina Long, Surrey, all of (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/155,556

(22) PCT Filed: Jan. 28, 1998

(86) PCT No.: PCT/GB98/00251

§ 371 (c)(1),
(2), (4) Date: Jul. 26, 1999

(87) PCT Pub. No.: WO98/34364

PCT Pub. Date: Aug. 6, 1998

(30) Foreign Application Priority Data

Jan. 31, 1997 (GB) ............................................. 9702084

(51) Int. Cl.$^7$ ................................................. H04J 14/02

(52) U.S. Cl. ...................... 359/127; 359/128; 359/130; 359/124; 359/179

(58) Field of Search ................................. 359/127, 130, 359/176, 179, 177, 174, 128, 124

(56) References Cited

U.S. PATENT DOCUMENTS

| | | | |
|---|---|---|---|
| 5,615,290 A | * 3/1997 | Harasawa | |
| 5,633,741 A | * 5/1997 | Giles | ........................... 359/124 |
| 6,061,484 A | * 5/1997 | Jones et al. | ..................... 385/24 |
| 5,726,785 A | * 3/1998 | Chawki et al. | .............. 359/130 |
| 5,742,416 A | * 4/1998 | Mizrahi | ........................ 359/134 |
| 5,793,905 A | * 8/1998 | Mizuochi et al. | .............. 385/24 |
| 5,838,477 A | * 11/1998 | Yamamoto et al. | .......... 359/179 |
| 6,011,644 A | * 1/2000 | Button et al. | ................. 359/341 |

FOREIGN PATENT DOCUMENTS

| | | |
|---|---|---|
| EP | 0638837 | 2/1995 |
| GB | 2305041 | 3/1997 |
| WO | WO 97/06614 | 2/1997 |
| WO | WO 97/06617 | 2/1997 |

OTHER PUBLICATIONS

Hill, GR, "A Wavelength Routeing Approach To Optical Communication Networks", British Telecom Technology Journal, vol. 6, No. 3, Jul. 1988.

Chawki, MJ et al., "Evaluating of an Optical Boosted Add/Drop Multiplexer Obadm, Including Circulators and Fiber Grating Filters" Proc. 21st European Conference on Optical Communication (ECOC '95—Brussels).

Gillner, L: "Properties of Optical Passive or Active Space Switches" IEE Proceedings J. Optoelectronics, vol. 140, No. 5, Part J, Oct. 1, 1993, pp. 309–315, XP000412793.

Kuo–Chun Lee Et Al: "Routing and Switching in a Wavelength Convertible Optical Network"Networking: Foundation for the Future San Francisco, Mar. 28—Apr. 1, 1993, vol. 2, No. CONF. 12, Mar. 28, 1993, Institute of Electrical and Electronics Engineers, pp. 578–585, XP000399037.

(List continued on next page.)

Primary Examiner—Leslie Pascal
Assistant Examiner—Hanh Phan

(57) ABSTRACT

A number of add/drop multiplexers having passive optical components for wavelength division multiplexing are described. These add/drop multiplexers are particularly adapted for use in branching units of networks to allow signals passing along fibers of a main trunk between terminal stations to be dropped to and added from a spur station, the design of the add/drop multiplexers allowing a reduced number of spur fibers as signals are routed between trunk fibers at spur fibers according to the carrier wavelength.

24 Claims, 2 Drawing Sheets

U.S. PATENT DOCUMENTS

Toba H Et AL: "Demonstration of Optical FDM Based Self–Healing Ring etwork Employing Arrayed–Waveguide –Grating ADM Filters and EDFAS", Proceedings of the European Conference on Optical Communication (EC, Firenze, Sep. 25–29, 1994, vol. 1, No. CONF. 20, Sep. 25, 1994, Instituto Internazionzle Delle Communicazioni, pp. 2630266, XP000671739.

Sian, SS Et Al.: "WDM Branching Unit With Gain and Spur Multiplexing", IEE Colloquium on WDM Technology and Applications, Frb. 6, 1997, London, UK, pp. 3/1–5, XP002063200.

Patent Abstracts of Japan, vol. 097, No. 010, Oct. 31, 1997 & JP 09 153861 A (Kokusai Denshin Denwa Co LTD < KDD>, Jun. 10, 1997.

Giles, CR Et Al; Low–Loss Add/Drop Multiplexers for WdM Lightwave Networks, AT&T Bell Labortories, IOOC '95, pp. 66–67.

* cited by examiner

ADD/DROP MULTIPLEXER

FIELD OF THE INVENTION

The present invention relates to an add/drop multiplexer for use in a wavelength division multiplexed optical network, and to a branching unit comprising such an add/drop multiplexer.

BACKGROUND OF THE INVENTION

Wavelength division multiplexing, termed WDM, (discussed in, for example, Spirit and O'Mahony, "High Capacity Optical Transmission Explained", John Wiley & Sons, Chichester, 1995, and Hill, British Telecom Technology Journal, 6 (3):24–31) is a technique of considerable benefit in optimising transmission of signals through fiber optic networks. In wavelength division multiplexing, traffic signals to be sent out by a station of the network are modulated on to a number of carrier signals at different predetermined carrier wavelengths. Each predetermined carrier wavelength is allocated according to the identities of the send station and of the intended receive station. Predetermined carrier wavelengths are spaced sufficiently far apart in wavelength that they can be discriminated from each other by components of the fiber optic system, but in many networks will also need to be grouped sufficiently closely that different (often all) carrier wavelengths can be amplified satisfactorily by the same amplifier in a repeater. The carrying capacity of a single fiber is enhanced by WDM—rather than carrying a single signal, the fiber is simultaneously carrying several signals, each at a different carrier wavelength.

Most such transmission networks have a number of nodes at which one or more branches separate from a main trunk or ring. Typically, at these nodes one or more carrier wavelengths are dropped down one or more fibers of the branch and one or more carrier wavelengths (which may be the same as, or different from, those dropped from the trunk or ring) are added to the trunk or ring from another fiber of the branch. The component which performs such a function is an add/drop multiplexer (ADM).

WDM is particularly well adapted to efficient routing of signals between send and receive stations. As different signals have different carrier wavelengths, optical components can be used to route signals appropriately by directing them according to the carrier wavelength of the signal. Example of an ADM of this type is disclosed in Giles and Mizrahi IOOC 95, ThC2-1 pp 66–67. This add/drop multiplexer comprises two three port circulators (107,108) with a fiber Bragg grating (105) between the second ports of the circulators (FIG. 3). The input of a first fiber (101) is connected to the first port of first circulator (107) and the output of the first fiber (102) is connected to the third port of the second circulator (108). A second fiber input (104) is connected to the first port of the second circulator (108) and a second output fiber (103) is connected to the third port of the first circulator (107). The two second ports are connected to each other with the fiber Bragg grating (105) therebetween. The reflection wavelength of the fiber Bragg grating is the wavelength to be added or dropped. Signals at any other wavelength enter the first port of the first circulator (107), pass through to the second port of the first circulator (107) and through the grating into the second port of the second circulator (108), then out of the first output (102). Signals at the fiber Bragg grating reflection wavelength arriving on the first fiber pass through from the first port to second port of the first circulator (107), are then reflected by the fiber Bragg grating (105) back to the second port of the first circulator (107), where they are circulated to the third port of the first circulator (107) and to the second output (103). By contrast, signals added at this wavelength on the second fiber input (104) pass from first to second port of the second circulator (108), whereafter they are reflected by the fiber Bragg grating (105) back to the second port of the second circulator (108), and are circulated out to the third port of the second circulator (108) and out onto the first (102) output.

In wavelength division multiplexed systems of significant length, it will be necessary to amplify the traffic signals. A particularly appropriate point to amplify the traffic signals is at a branching unit, because the routing of traffic signals through the add/drop multiplexer will be accompanied by loss of power. Chawki et al, "Evaluation of an Optical Boosted Add/Drop Multiplexer OBADM including circulators and fiber grating filters", Proc. 21st Eur. Conf. on Opt. Comm. (ECOC"95—Brussels), discloses an add/drop multiplexer of this type incorporating a bidirectional amplifier. The bidirectional amplifier is located between the first three port circulator and the fiber Bragg grating. With the configuration described above, the bidirectional amplifier will amplify all signals remaining on the trunk (from first inp;ut to first output) together with the signal dropped from the trunk to the branch (second output). The add signal (first input) will, however, not be amplified. In an alternative arrangement, instead of the fiber Bragg grating reflecting the add/drop wavelength or wavelengths, fiber Bragg gratings are provided to reflect all the traffic signal wavelengths for onward transmission along the trunk. In this case, the third port of the first circulator is connected to the trunk output and third port of the second circulator is connected to the branch drop output. In this case, all wavelengths will be amplified, the traffic signal remaining on the trunk being amplified twice and the add and the drop signals being amplified once.

Although these arrangements are useful, it is particularly desirable to simplify the ADM design to minimise the number of optical components, while obtaining low losses and a controllable and balanced system response. A particular difficulty arises when there are a plurality of fibers on the trunk. It is particularly desirable to handle effectively the adding or dropping of signals from a branch station to a trunk with such a plurality of fibers.

Accordingly, an earlier application of the present applicants, International Patent Application No. PCT/GB96/01891, discloses a plurality of arrangements in which an ADM combines traffic signals dropped from a plurality of trunk fibers onto a single spur drop fiber and splits from a single spur add fiber a plurality of add signals for adding to different fibers of the trunk. Such arrangements allow for mininisation of the number of optical components required and for effective balancing of losses. However, these designs do not themselves provide for efficient amplification of the traffic signals.

SUMMARY OF THE INVENTION

Accordingly, the invention provides an add/drop multiplexer for use in a wavelength division multiplexed optical network, the add/drop multiplexer having a first trunk input for receiving traffic signals from a first part of a first trunk fiber, a second trunk input for receiving traffic signals from a first part of a second trunk fiber, a first trunk output for outputting traffic signals to a second part of the first trunk fiber, a second trunk output for outputting traffic signals to a second part of the second trunk fiber, a branch input for receiving traffic signals from a branch input fiber, and a branch output for outputting traffic signals to a branch output fiber;

the add/drop multiplexer comprising:
means of routing from the first trunk input to the branch output a first
set of traffic signals at carrier wavelengths predetermined for transmission of signals from the first trunk fiber to a branch station and for routing from the second trunk input to the branch output a second set of traffic signals at carrier wavelengths predetermined for transmission of signals from the second trunk fiber to the branch station, and means for combining said first and second sets of traffic signals for output at the branch output;
means for separating traffic signals received at the branch input into a third set of traffic signals at carrier wavelengths predetermined for transmission of signals from the branch station to the first trunk fiber and a fourth set of traffic signals at carrier wavelengths predetermined for transmission of signals from the branch station to the second trunk fiber, and means for routing the third set of traffic signals to the first trunk output and the fourth set of traffic signals to the second trunk output respectively; and
one or more amplifiers located on traffic signal paths determined by said routing means, such that said one or more amplifiers amplify each routing for traffic signals determined by said routing means and each of said one or more amplifiers is adapted to amplify traffic signals for a plurality of said routings.

Preferably, the amplifiers are bidirectional, in which case at least one of the amplifiers can support traffic signal routings which are arranged to pass through that amplifier in opposite directions. Particularly appropriate are doped fiber amplifiers, in which case the add/drop multiplexer also comprises a pumping section for pumping the doped fiber amplifier. The pumping section comprise a first laser and a fiber optic coupler, wherein the output of the first laser is split into two output paths by the fiber optic coupler. A further advantageous arrangement provides redundancy by the addition of a second laser connected to the same side of the fiber optic coupler as the first laser so that light provided on each of these two output paths is a combination of light provided by the first laser and light provided by the second.

In preferred arrangements, the add/drop multiplexer comprises a plurality of optical circulators and a plurality of notch reflector filters, preferably fiber Bragg gratings. In preferred arrangements, the plurality of optical circulators forms a linear chain, and the first and last circulators of the chain are three port circulators. It is advantageous that a first set of notch reflection filters is then provided between the first and second circulator to reflect signals at a first set of one or more traffic signal wavelengths and a second set of notch reflection filters is provided between the penultimate and the last circulator to reflect signals at a second set of one or more traffic signal wavelengths. In a particularly preferred arrangement, at least two amplifiers are provided, wherein one of the two amplifiers is located between the first circulator and the first set of notch reflection filters and the other of two amplifiers is located between the second set of reflection filters and the last circulator. Advantageously in this arrangement, the pumping section has at least two outputs, one of the two outputs is coupled to the linear chain adjacent to these two amplifiers and the second of the two outputs is coupled to the linear chain adjacent to the second of the two amplifiers.

In a further aspect, the invention provides an add/drop multiplexer for use in a wavelength division multiplexed optical network, the add/drop multiplexer having a plurality of inputs each for receiving traffic signals from a different fiber of the network and a plurality of outputs each for outputting traffic signals to a different fiber of the network, wherein the add/drop multiplexer comprises a plurality of optical circulators and a plurality of notch reflection filters wherein:

the plurality of optical circulators form a linear chain;
the first and last circulators in the chain are three port circulators, wherein the first port of each of the first and last circulators is connected to a different input of the add/drop multiplexer, and wherein the third port of each of the first and last circulators is connected to a different output of the add/drop multiplexer, wherein the second port of each of the first and last circulators is connected to the adjacent circulator in the linear chain; and one or more further circulators in the linear chain are four port circulators, wherein a first port of each of said further circulators is connected to a different input of the add/drop multiplexer, a fourth port of each of said further circulators is connected to a different output of the add/drop multiplexer, and the second and third ports of each of said further circulators are connected to adjacent circulators in said linear chain.

BRIEF DESCRIPTION OF THE DRAWINGS

Specific embodiments of the invention are described in detail below, by way of example, with reference to the accompanying drawings, of which.

DESCRIPTION OF THE PREFERRED EMBODIMENT

Figure 1:
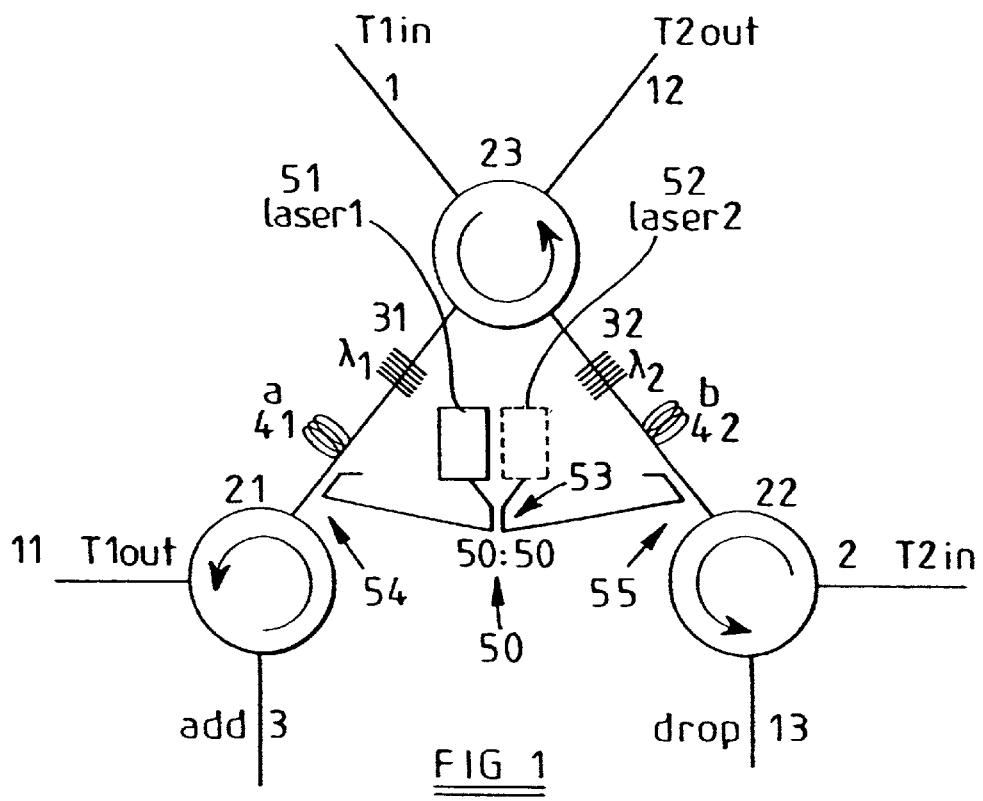
FIG. 1 shows the first embodiment of an add/drop multiplexer according to the invention.

FIG. 1 shows a first embodiment of an add/drop multiplexer according to the invention for use in a wavelength division multiplexed optical network. The add/drop multiplexer has a first trunk input (1) for receiving traffic signals from a first part of a first trunk fiber, a second trunk input (2) for receiving traffic signals from a first part of a second trunk fiber, a first trunk output (11) for outputting traffic signals to a second part of the first trunk fiber and a second trunk output (12) for outputting traffic signals to a second part of the second trunk fiber. The add/drop multiplexer also has a branch input (3) for receiving traffic signals from a branch input, or add, fiber, and a branch output (13) for outputting traffic signals to a branch output, or drop, fiber.

The add/drop multiplexer comprises means for routing from the first trunk input (1) to the branch output (13) of the first set of traffic signals at carrier wavelengths predetermined transmission of signals from the first trunk fiber to a branch station and for routing from the second trunk input (2) to the branch output (13) a second set of traffic signals and carrier wavelengths predetermined for transmission of signals from the second trunk fiber to the branch station, and means for combining said first and second sets of traffic signals for output at the branch output (13).

In this embodiment, these routing means comprise three optical circulators (21,22,23) and two sets of fiber Bragg gratings (31,32). In this case there is one fiber Bragg grating in each set, the first fiber Bragg grating (31) reflecting signals at wavelength $\lambda_1$ and the second fiber Bragg grating (32) reflects signals at wavelength $\lambda_2$. The first fiber Bragg grating (31) is located between the second port of first circulator (21), which is a three port circulator, and the second port of the second circulator (23), which is a four port circulator. The second fiber Bragg grating (32) is located between the third port of the second circulator (23) and the second port of the third, and last, circulator (22), which is a three port circulator. The signals routed from the first trunk input (1) to the branch output (13) are at wavelength $\lambda_1$, the wavelength reflected by the first fiber Bragg grating. The signals enter on fiber (1) at the first port of the four port circulator (23), are circulated to the second port and pass out to the first fiber Bragg grating (31), where they are reflected. These signals thus reenter the second port of the four port circulator (23) and pass out to the third port of the four port circulator (23). The signals then pass through the second fiber Bragg grating (32) to the second port of the last circulator (22) and out of the third port of the first circulator (22) to branch output fiber (13). Similarly, traffic signals at wavelength $\lambda_2$ are dropped from the second trunk input (2). These signals enter the first port of the last circulator (22), pass out of the second port of that circulator (22) and are reflected by the second fiber Bragg grating (32) back to the second port of the last circulator (22). The signal is then circulated to the third port of the last circulator (22) and out on to the branch output fiber (13). The circulator arrangement thus routes signals at these wavelengths from the respective trunk inputs and combines them for dropping at the branch output fiber (13).

The add/drop multiplexer also has means for separating traffic signals received at the branch input (3) into a third set of traffic signals at carrier wavelength predetermined for transmission of signals from the branch station to the first trunk fiber and a fourth set of traffic signals at a carrier wavelength predetermined for transmission of signals from the branch station to the second trunk fiber and means for routing the third set of traffic signals to the first trunk output (11) and the fourth set of traffic signals to the second trunk output (12) respectively.

Accordingly, traffic signals are provided at branch input (3) at carrier wavelength $\lambda_1$ for routing to the first trunk output (11) and $\lambda_2$ for routing to the second trunk output (12). These signals enter at the first port of the first circulator (21). The signals at $\lambda_1$ pass out of the second port of the first circulator (21) but are reflected at the first fiber Bragg grating (31). The signals thus pass back to the input of the first circulator (21) and out through the third port of the circulator (21) to the first trunk output (11). Signals at $\lambda_2$ by contrast, pass through the first fiber Bragg grating (31) to the second port of the four port circulator (23). Signals are thus circulated out to the third port of the four port circulator (23) and pass out to the second fiber Bragg grating (32), where they are reflected. The signals thus pass back to the third port of the four port circulator (23) and out through the fourth port onto the second trunk output (12).

The add/drop multiplexer also comprises one or more amplifiers located on traffic signal paths determined by these routing means, such that the amplifiers between them amplify each routing for traffic signals determined by the routing means and whereby each of the amplifiers is adapted to amplify traffic signals for a plurality of routings.

In the FIG. 1 embodiment, there are two amplifiers (41,42). These amplifiers are bidirectional, and are thus able to amplify traffic signals passing in either direction therethrough. In the embodiment shown, the amplifiers (41,42) are doped fiber amplifiers, preferably erbium doped fiber amplifiers. In the FIG. 1 embodiment, there are two such amplifiers. First amplifier (41) is located between the second port of the first circulator (21) and the first fiber Bragg grating (31), whereas the second amplifier (42) is located between the second port of the last circulator (22) and the second fiber Bragg grating (32). As the amplifiers (41,42) are doped fiber amplifiers, it is necessary for them to be pumped. This is achieved by a pumping section (50). The pumping section comprises either one or two lasers (51,52) whose output is provided to one side of a fiber optic coupler (53). The advantage of providing two lasers is that redundancy is provided thereby and the system will still function in the event of the failure of one laser. The output from the laser or lasers is split by the coupler onto two output paths. One output path is coupled by means of a first further fiber optic coupler (54) to provide pumping light for amplifier (41), whereas the other output path is provided by means of a second further fiber optic coupler (55) to pump the second amplifier (42). The further couplers are preferably adapted so that all the pumping light is transferred across the coupler to pump the amplifier, but that none of the traffic signals are transferred across the coupler for direction to the pumping section (50). In the arrangement shown, the couplers are provided between the amplifiers (41,42) and the adjacent circulators (21,22).

As can be seen, the circulators in FIG. 1 form a linear chain. Inclusion of the pumping section gives a ring structure, but it will be noted that no traffic signals travel along the pumping section part of this ring. It will be appreciated by the skilled man that similar linear chain arrangements with a first and a last three port circulator but with a plurality of four port circulators therebetween may be implemented in the case of branching units for use with further trunk fibers or branches.

TABLE 1

| CHANNEL | WAVELENGTH | AMPLIFIED BY |
|---|---|---|
| Trunk 1 through | $\lambda_2$ | 41 |
| Trunk 2 through | $\lambda_1$ | 42 |
| Trunk 1 drop | $\lambda_1$ | 42 |
| Trunk 2 drop | $\lambda_2$ | 42 |
| Trunk 1 add | $\lambda_1$ | 41 |
| Trunk 2 add | $\lambda_2$ | 41 |

As is shown in Table 1 above, each required routing for traffic signals between an input and an output achieved by the add/drop multiplexer (it is noted that in this arrangement there is no routing of the signals between the first and the second trunk fiber) is amplified, and that each of the amplifiers (41,42) amplifies a plurality of such routings. First amplifier (41) amplies once signals passing directly along the first trunk, amplifies twice signals added to the first trunk from the branch input (3), and amplifies once signals added to the second trunk from the branch input (3). Second amplifier (42) amplifies once signals passing straight along the second trunk, amplifies once signals dropped from the first trunk to the branch output (13), and amplifies twice signals dropped from the second trunk to the branch output (13).

Figure 2:
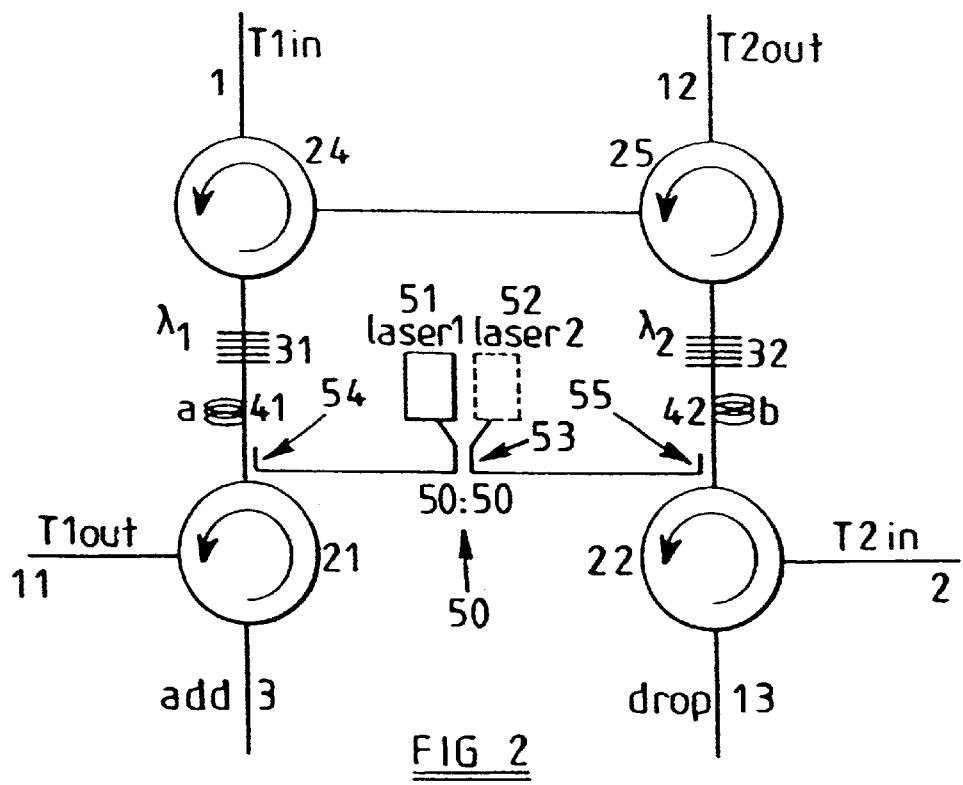
FIG. 2 shows a second embodiment of an add/drop multiplexer according to the invention.
Figure 3:
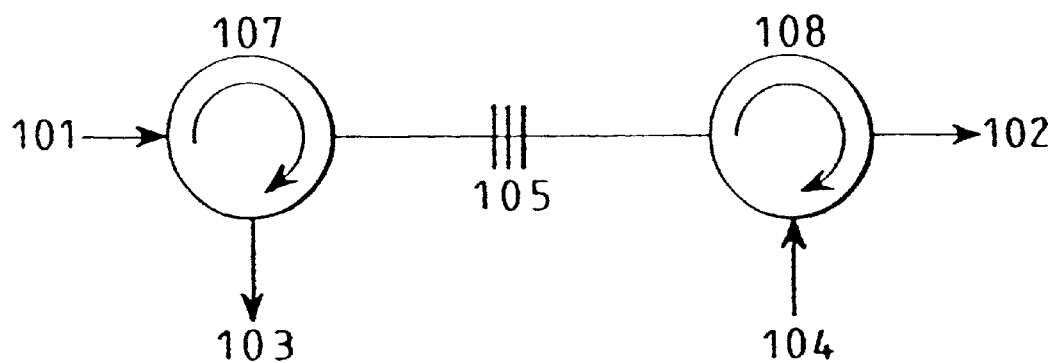
FIG. 3 shows a prior art add/drop multiplexer.

A similar arrangement achieving the same functionality is shown in FIG. 2. In this second embodiment, there are four circulators in a linear chain, and all of the circulators are three port circulators. At the pumping section and first and last circulator are as in the first embodiment, as are the amplifiers (41,42) and the first and second fiber Bragg grating (31,32). However, the second circulator (23) is now replaced by two midchain three port circulators (24,25) (termed here "midchain" circulators as they are in the middle rather than at the end, of the linear chain). For the first midchain circulator (24), the first port is connected to the first trunk input (24), the second port is connected to the first fiber Bragg grating (31), and the third port is connected to the first port of the second midchain circulator (25). The second port of the second midchain circulator (25) is connected to the second fiber Bragg grating (32) and the third port of this circulator (25) is connected to the second trunk output (12).

As can be seen, the functionality of this embodiment is the same as that of the first embodiment, and the same traffic signal routings are amplified the same number of times by the same amplifiers as before. Again, the arrangement can be expanded by adding further three port circulators (in pairs if symmetry is required in channels for inut and output). A combination of three and four port circulators could also be provided.

It will be appreciated that these arrangements will provide an effective add/drop multiplexer arrangement suitable for use even when no amplification is required. In this event, pumping section (50) and couplers (54,55) are not required, and neither are amplifiers (41,42). The FIG. 1 embodiment in particular provides an especially low component count for a device of its functionality.

Provision of the amplifiers (41,42) within an add/drop multiplexer of this type is particularly advantageous, as it allows all traffic signal routings required to be amplified effectively with only two doped fiber amplifiers. This allows for particularly effective optimisation of design of an add/drop multiplexer combining reduction of component count and controllability of losses and gain.

What is claimed is:

1. An add/drop multiplexer for use in a wavelength division multiplexed optical network, the add/drop multiplexer having a first trunk input for receiving traffic signals from a first part of a first trunk fiber, a second trunk input for receiving traffic signals from a first part of a second trunk fiber, a first trunk output for outputting traffic signals to a second part of the first trunk fiber, a second trunk output for outputting traffic signals to a second part of the second trunk fiber, a branch input for receiving traffic signals from a branch input fiber, and a branch output for outputting traffic signals to a branch output fiber;

the add/drop multiplexer comprising:
 means of routing from the first trunk input to the branch output a first set of traffic signals at carrier wavelengths predetermined for transmission of signals from the first trunk fiber to a branch station and for routing from the second trunk input to the branch output a second set of traffic signals at carrier wavelengths predetermined for transmission of signals from the second trunk fiber to the branch station, and means for combining said first and second sets of traffic signals for output at the branch output;
 means for separating traffic signals received at the branch input into a third set of traffic signals at carrier wavelengths predetermined for transmission of signals from the branch station to the first trunk fiber and a fourth set of traffic signals at carrier wavelengths predetermined for transmission of signals from the branch station to the second trunk fiber, and means for routing the third set of traffic signals to the first trunk output and the fourth set of traffic signals to the second trunk output respectively; and
 one or more amplifiers located on traffic signal paths determined by said routing means, such that said one or more amplifiers amplify each routing for traffic signals determined by said routing means and each of said one or more amplifiers is adapted to amplify traffic signals for a plurality of said routings.

2. Add/drop multiplexer as claimed in claim 1, wherein said one or more amplifiers are bidirectional amplifiers, and wherein for at least one of said one or more amplifiers traffic signal routings are arranged pass through said amplifier in opposite directions.

3. Add/drop multiplexer as claimed in claim 1, wherein said one or more amplifiers are doped fiber amplifiers, and wherein the add/drop multiplexer further comprises a pumping section for pumping of said doped fiber amplifiers.

4. Add/drop multiplexer as claimed in claim 3, wherein said pumping section comprises a first laser and a fiber optic coupler, wherein the output of the first laser is split into two output paths by said fiber optic coupler.

5. Add/drop multiplexer as claimed in claim 4, wherein said pumping section further comprises a second laser, wherein the second laser and the first laser are connected to the same side of the fiber optic coupler so that light provided on each of the two output paths is a combination of light provided by the first laser and light provided by the second laser.

6. Add/drop multiplexer as claimed in claim 3, wherein the add/drop multiplexer comprises a plurality of optical circulators and a plurality of notch reflection filters.

7. Add/drop multiplexer as claimed in claim 6, wherein said notch reflection filters are fiber Bragg gratings.

8. Add/drop multiplexer as claimed in claim 6, wherein the plurality of optical circulators forms a linear chain.

9. Add/drop multiplexer as claimed in claim 8, wherein the first and last circulators in the chain are three port circulators.

10. Add/drop multiplexer as claimed in claim 9, wherein the first port of each of the first and last circulators is connected to a different input of the add/drop multiplexer, and wherein the third port of each of the first and last circulators is connected to a different output of the add/drop multiplexer, wherein the second port of each of the first and last circulators is connected to the adjacent circulator in the linear chain.

11. Add/drop multiplexer as claimed in claim 10, wherein one or more further circulators in the linear chain are four port circulators, wherein a first port of each of said further circulators is connected to a different input of the add/drop multiplexer, a fourth port of each of said further circulators is connected to a different output of the add/drop multiplexer, and the second and third ports of each of said further circulators are connected to adjacent circulators in said linear chain.

12. Add/drop multiplexer as claimed in claim 11, wherein the linear chain consists of three circulators.

13. Add/drop multiplexer as claimed in claim 10, wherein one or more further circulators in the linear chain are three port circulators, wherein for said further three port circulators either the first port of the further three port circulator is connected to an input of the add/drop multiplexer and the second and third ports of the further three port circulator are connected to adjacent circulators of the linear chain, or the third port of the further three port circulator is connected to an output of the add/drop multiplexer and the first and second ports of the further three port circulator are connected to adjacent circulators of the linear chain.

14. Add/drop multiplexer as claimed in claim 13, wherein the linear chain consists of four circulators, and wherein both the second and the third circulator in the chain are three port circulators.

15. Add/drop multiplexer as claimed in claim 14, wherein the first port of the second circulator has an input of the add/drop multiplexer connected thereto and the third port of the third circulator has an output of the add/drop multiplexer connected thereto.

16. Add/drop multiplexer as claimed in claim 8, wherein a first set of notch reflection filters is provided between the first and a second circulator to reflect signals at a first set of one or more traffic signal wavelengths, and a second set of notch reflection filters is provided between the penultimate and the last circulator to reflect signals at a second set of one or more traffic signal wavelengths.

17. Add/drop multiplexer as claimed in claim 16, wherein said one or more amplifiers are located on the linear chain between the first and the last circulators.

18. Add/drop multiplexer as claimed in claim 17, wherein at least two amplifiers are provided, wherein one of said two amplifiers is located between the first circulator and the first set of notch reflection filters and the other of said two amplifiers is located between the second set of notch reflection filters and the last circulator.

19. Add/drop multiplexer as claimed in claim 18, wherein the output or outputs of the pumping section is or are coupled to the linear chain by one or more further fiber optic couplers.

20. Add/drop multiplexer as claimed in claim 19, wherein the pumping section has at least two outputs, wherein one of said two outputs is coupled to the linear chain adjacent to the first of said two amplifiers and the second of said two outputs is coupled to the linear chain adjacent to the second of said two amplifiers.

21. Add/drop multiplexer as claimed in claim 20, wherein the first of said pumping section outputs is coupled to the linear chain between the first circulator and the first amplifier, and the second of said pumping section outputs is coupled to the linear chain between the second amplifier and the last circulator.

22. An add/drop multiplexer for use in a wavelength division multiplexed optical network, the add/drop multiplexer having a plurality of inputs each for receiving traffic signals from a different fiber of the network and a plurality of outputs each for outputting traffic signals to a different fiber of the network, wherein the add/drop multiplexer comprises a plurality of optical circulators and a plurality of notch reflection filters wherein:

the plurality of optical circulators form a linear chain;

the first and last circulators in the chain are three port circulators, wherein the first port of each of the first and last circulators is connected to a different input of the add/drop multiplexer, and wherein the third port of each of the first and last circulators is connected to a different output of the add/drop multiplexer, wherein the second port of each of the first and last circulators is connected to the adjacent circulator in the linear chain; and one or more further circulators in the linear chain are four port circulators, wherein a first port of each of said further circulators is connected to a different input of the add/drop multiplexer, a fourth port of each of said further circulators is connected to a different output of the add/drop multiplexer, and the second and third ports of each of said further circulators are connected to adjacent circulators in said linear chain.

23. An add/drop multiplexer as claimed in claim 22, wherein a set of notch reflection filters is provided between one or more pairs of adjacent circulators to reflect signals at a set of one or more traffic signal wavelengths.

24. An add/drop multiplexer as claimed in claim 23, wherein the add/drop multiplexer comprises only one further circulator, and wherein:

the first port of the first circulator is connected to an input from a branch of the network;

the third port of the first circulator is connected to an output to a first trunk of the optical network;

the first port of the second circulator is connected to an input from the first trunk of the optical network;

the fourth port of the second circulator is connected to an output to a second trunk of the optical network;

the first port of the third circulator is connected to an input from the second trunk of the optical network;

the third port of the third circulator is connected to an output to a branch of the network; and a first set of notch reflection filters is provided between the first and the second circulator to reflect signals at a first set of one or more traffic signal wavelengths, and a second set of notch reflection filters is provided between the second and the third circulator to reflect signals at a second set of one or more traffic signal wavelengths.

\* \* \* \* \*